Patented Nov. 10, 1936

2,060,677

UNITED STATES PATENT OFFICE 2,060,677

TILE AND CONCRETE BINDING PLASTIC

Joseph Labra, Long Island City, N. Y.

No Drawing. Application September 3, 1935,
Serial No. 38,982

2 Claims. (Cl. 106—23)

This invention relates to a new process for cementing tile, including mosaic, glassed and common tile as known to the trade, and to a composition which can also be used for cementing insulating and artificial materials in place, upon wood, concrete, or other floor or supporting surfaces or bodies.

A further object of the invention is to provide a composition which can be effectively used for filling cracks in concrete and similar constructions.

The invention is embodied in a composition which is made up of the following ingredients: 11 gallons of water; 5 ounces of sodium salicylate; 2½ ounces sodium carbonate; 30 ounces calcium hydroxide; 20 ounces sulphated castor oil; 20 ounces trisodium phosphate; 25 lbs. of casein; 50 ounces hexamethylenetetramine; 30 ounces of sulphur; 20 ounces of zinc oxide; 10 gallons of 60% Vultex; 40 lbs. of asbestos; 40 ounces of Collodial Micronex.

This mass is thoroughly mixed together, and is applied to the tile or other materials to be cemented and allowed to set. When a very smooth finish is desired on the object to be covered the asbestos may be left out.

I have found that the composition gives very satisfactory service when used on all kinds of tile, for cementing the same to floors and walls, or other surfaced supports; and for cementing all types of artificial composition materials, used for insulation or other purposes. I have also found that fine cracks in concrete and other similar materials may be filled with the material, so that the repaired work does not disclose the filling material. The casein used is preferably B2.

I claim as new and patentable:

1. A composition for cementing tile and materials in place, consisting of a mixture of water, sodium salicylate, sodium carbonate, calcium hydroxide, trisodium phosphate, casein, sulphated castor oil, sulphur, zinc oxide, and Vultex.

2. A composition for cementing materials in place, consisting of a mixture of approximately 11 gallons of water, 5 ounces of sodium salicylate, 2½ ounces trisodium phosphate; 25 pounds B2 casein; 50 ounces of hexamethylenetetramine; 20 ounces of sulphated castor oil; 30 ounces of sulphur; 20 ounces of zinc oxide; 10 gallons of 60% Vultex; 40 lbs. of abestos; and 40 ounces of Collodial Micronex.

JOSEPH LABRA.